United States Patent [19]
Oestreich et al.

[11] Patent Number: 5,486,378
[45] Date of Patent: Jan. 23, 1996

[54] METHOD AND APPARATUS FOR MANUFACTURING AN OPTICAL RIBBON CONDUCTOR

[75] Inventors: Ulrich Oestreich, Munich; Peter Dotzer, Berg/Bachhausen; Siegfried Unterberger, Coburg, all of Germany

[73] Assignee: Siemens Aktiengesellschaft, Munich, Germany

[21] Appl. No.: 105,401

[22] Filed: Aug. 11, 1993

[30] Foreign Application Priority Data

| Aug. 11, 1992 | [DE] | Germany | 42 26 600.9 |
| Jun. 4, 1993 | [DE] | Germany | 43 18 664.5 |
| Jun. 8, 1993 | [DE] | Germany | 43 19 087.1 |

[51] Int. Cl.[6] ..................... B05D 5/66
[52] U.S. Cl. ............... 427/163.2; 427/385.5; 427/434.7; 118/405; 118/419; 118/420; 118/428
[58] Field of Search ............... 427/163.2, 385.5, 427/434.7; 118/405, 419, 420, 428

[56] References Cited

U.S. PATENT DOCUMENTS

| 4,147,407 | 4/1979 | Eichenbaum et al. | 350/96.34 |
| 4,720,165 | 1/1988 | Tokuda et al. | 350/96.24 |
| 4,810,429 | 3/1989 | Mayr | 427/163.2 |

FOREIGN PATENT DOCUMENTS

| 0330277 | 8/1989 | European Pat. Off. . |
| 0438668A2 | 7/1991 | European Pat. Off. . |
| 3733124 | 4/1989 | Germany . |

Primary Examiner—Janyce Bell
Attorney, Agent, or Firm—Hill, Steadman & Simpson

[57] ABSTRACT

A plurality of light waveguides are conducted side-by-side through a coating arrangement that will surround the waveguides and supply them with a coating material for enclosing the light waveguides to form a ribbon conductor. The light waveguides are guided freely running both proceeding as in the coating arrangement so that they essentially come into contact only with the coating material. A drag flow or entrained flow of the liquid coating material contributes to a self-centering of the light waveguides and is produced by the longitudinal motion of the light waveguides in the coating material of the arrangement.

39 Claims, 7 Drawing Sheets

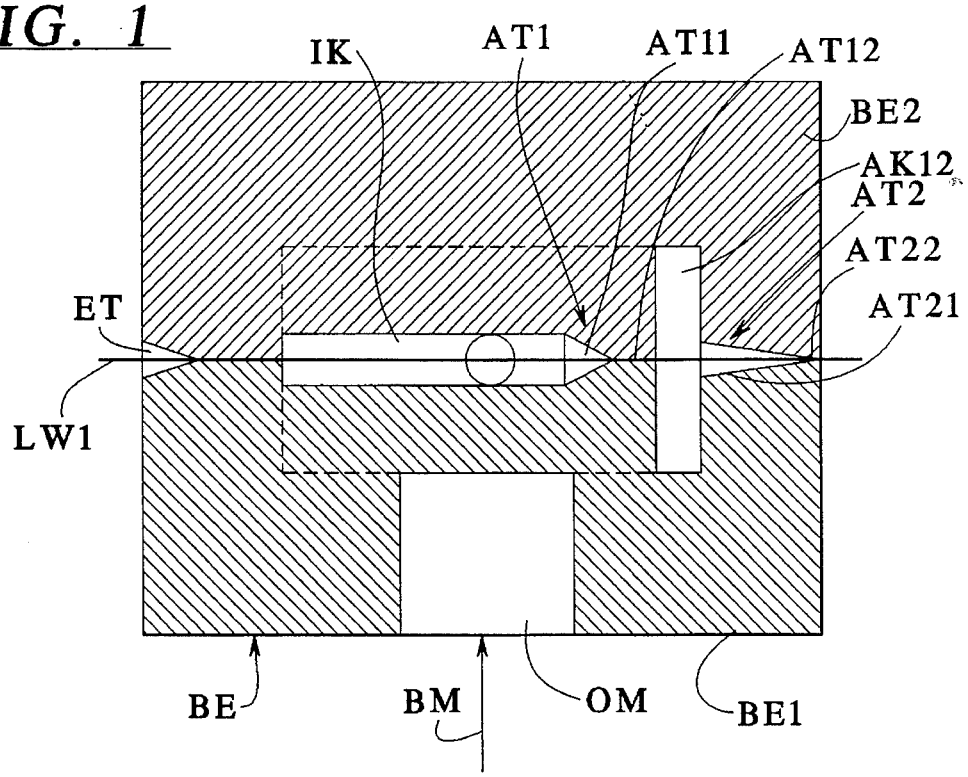
FIG. 1
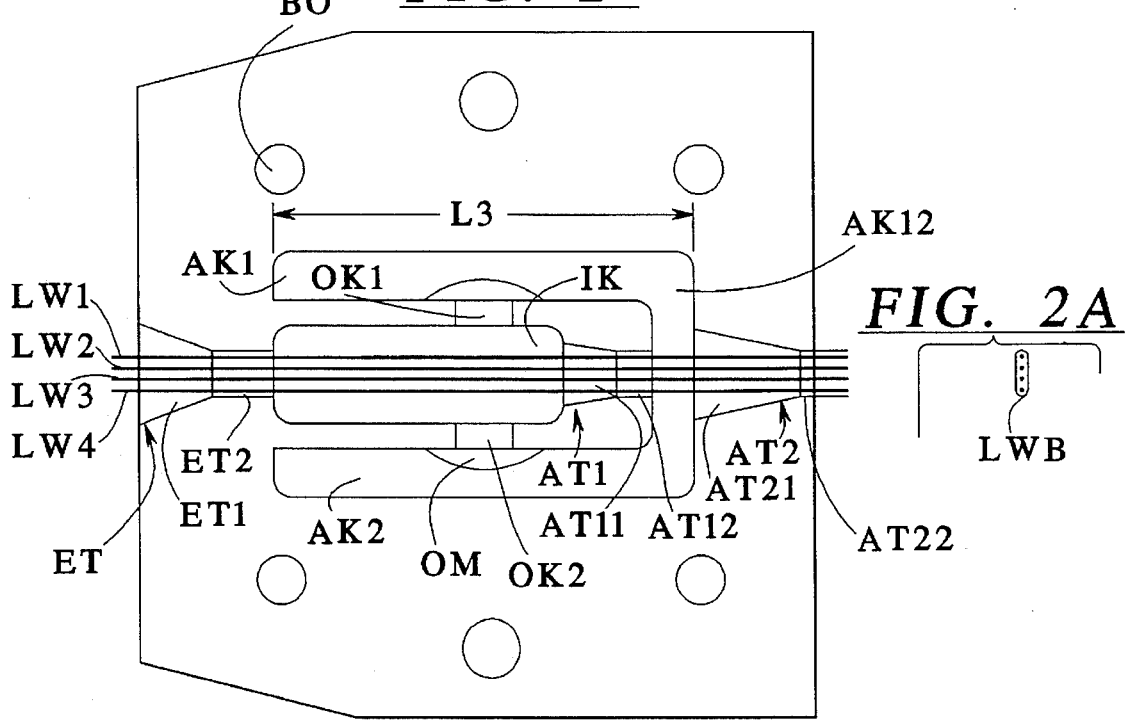
FIG. 2
FIG. 2A

5,486,378

METHOD AND APPARATUS FOR MANUFACTURING AN OPTICAL RIBBON CONDUCTOR

BACKGROUND OF THE INVENTION

The present invention is directed to a method for manufacturing an optical ribbon conductor or stripline, wherein a plurality of pre-coated light waveguides are conducted side-by-side through a coating arrangement that surrounds them and applies a coating material which serves the purpose of enclosing the light waveguides into a ribbon.

U.S. Pat. No. 4,147,407, whose disclosure is incorporated herein by reference thereto, discloses a method for manufacturing a ribbon conductor wherein pre-coated light waveguides, which are light waveguides that have been provided with a coating, are drawn through a rectangular nozzle as a solvent is additionally supplied to the nozzle. This solvent will cause softening of the coatings of the light waveguide so that the various coatings of the light waveguides will fuse to one another. Since the light waveguides must immediately touch each other in order to achieve the desired fusing, the opening can be selected only of such a size that the light waveguides will just fit therethrough. This, however, is not free of problems in view of the fact that the diameters of the coatings are subject to certain fluctuations. In addition, it is always required in this method that the coated light waveguides come into contact with the outside walls of the rectangular coating nozzle, and this contact will lead to an abrasion and/or to mechanical stressing of the light waveguides.

German Published Application 37 33 124 discloses a method for gluing light waveguides to one another in order to form an optical ribbon conductor or stripline, wherein the light waveguides are conducted through a rectangular coating nozzle. Here, too, it is provided that the individual light waveguides are pressed against one another, to which end a sliding contact under a spring bias is provided at one side of the coating nozzle. This sliding contact, in fact, enables a certain compensation of tolerances given diameter fluctuations of the coatings of each of the waveguides; however, the problem remains that the frictional forces and the undesirable and disturbing abrasion of the coating material can occur due to the close contact between the inside wall of the nozzle and the coating of each of the waveguides.

European Published Application 0 438 668 A2 discloses a coating method, wherein the light waveguides are conducted over at least one roller provided with grooves before entry into the coating means in order to impress a defined position and defined spacing relative to one another on the waveguides. However, it is not guaranteed without further ado that the light waveguides in fact retain the position which is imposed on them by the roller provided with grooves during the further travel through the coating means. A guide block is, therefore, additionally provided between the admission channel and the discharge channel, and this guide block comprises a plurality of grooves proceeding parallel to one another so that one light waveguide will lie in each of the grooves and the light waveguides are, thus, defined additionally and anew in terms of their spacing relative to one another.

All of the methods mentioned above proceed on the basis of the idea that the light waveguides must be aligned in terms of their position relative to one another by a mechanical guidance, whether it is the wall of the nozzle or by grooved guide rollers or guide blocks. This alignment will result in the fact that the light waveguides are always in contact with a mechanically rigid component part, namely the coating nozzle or the grooved guide means, or are touching these elements. Thus, stressing of the light waveguides due to friction and abrasion will occur and, moreover, difficulties can occur when the thickness of a pre-coating of the light waveguides has a higher tolerance value. Due to the mechanical stressing of the light waveguide coatings, moreover, the known methods have the disadvantage that high throughput speeds cannot be easily obtained because an increase in the throughput speed will cause a disproportionate increase in the mechanical stressing, particularly in view of the abrasion to be anticipated. An over-pressure of the coating material in the coating means, which pressure is applied in all methods, moreover, will cause a decentering or misalignment; for example, the fibers in the finished ribbon will not lie in one plane.

SUMMARY OF THE INVENTION

The object of the present invention is based on providing a method wherein the light waveguides are arranged optimally exactly centrally within the coated material without rigid guide components that mechanically contact and engage the coating.

The object is achieved in a method for manufacturing optical ribbon conductors or striplines, wherein a plurality of pre-coated light waveguides are conducted side-by-side through coating means that will embrace them and the coating means will then be supplied with a coating material that serves the purpose of enclosing the light waveguides. The improvements are guiding the light waveguide running both before as well as in the coating means so that they essentially come into contact only with the supplied coating material, and in that a drag or entrained flow of the liquid coating material is produced by the longitudinal movement of the light waveguides which drag flow will cause a self-alignment of the light waveguides within the coating material.

By contrast to the known solutions, the alignment and, thus, centering is not effected by pressing the light waveguides against the wall or against grooved side devices or the like, but is obtained in that the coating material together with the light waveguides are drawn through this material and produce pressures in both axes due to the production of a drag flow, these pressures being more likely to increase in size with decreasing layer thickness. It is, thus, not provided in the invention that the light waveguides come into contact with wall parts in the region of the coating means; rather, they remain embedded in the drag flow of the liquid coating material here. On the one hand, this will cause an especially gentle conveying and, on the other hand, this will cause an automatic alignment effect. It is, thus, assured by the invention that the centering and the adjustment of the light waveguides within the ribbon conductor, which centering is a uniform and symmetrical distribution of the light waveguides within the contour established by the coating material, can be achieved practically without mechanical stressing. The axes of the light waveguides, thus, lie practically in one plane and the coating material is applied everywhere with approximately the same thickness. Such an exact positioning of the light waveguides is of special significance because, among other reasons, all light waveguides are to be connected to one another in one working cycle given, for example, splicing procedures at an optical ribbon conductor, and this can only be implemented in a simple way with the light waveguides already lying in one plane within the ribbon conductor from the very outset and without noteworthy deviation and without fluctuating spacings insofar as possible.

The invention is also directed to an apparatus for manufacturing an optical ribbon conductor or stripline, wherein a plurality of light waveguides are guided side-by-side in a through passage in a coating means that surrounds them and to which coating material that serves the purpose of enclosing light waveguides is supplied. This apparatus is characterized in that the through openings for the light waveguides are dimensioned so that the light waveguides can be guided freely running in the coating means so that they essentially come into contact only with the coating material and in that the coating means comprises at least one discharge channel tapering in a transmitting direction that is fashioned so that a drag or entrained flow of the coating material arises due to the longitudinal motion of the light waveguides.

Other advantages and features of the invention will be readily apparent from the following description of the preferred embodiments, the drawings and claims.

BRIEF DESCRIPTION OF THE DRAWINGS

FIG. 1 is a longitudinal cross sectional view of a coating apparatus in accordance with the present invention;

FIG. 2 is a plan view of a bottom half of the coating apparatus of FIG. 1;

FIG. 2a is an end view of a ribbon conductor formed in the coating apparatus of FIGS. 1 and 2;

DESCRIPTION OF THE PREFERRED EMBODIMENTS

Figure 9:
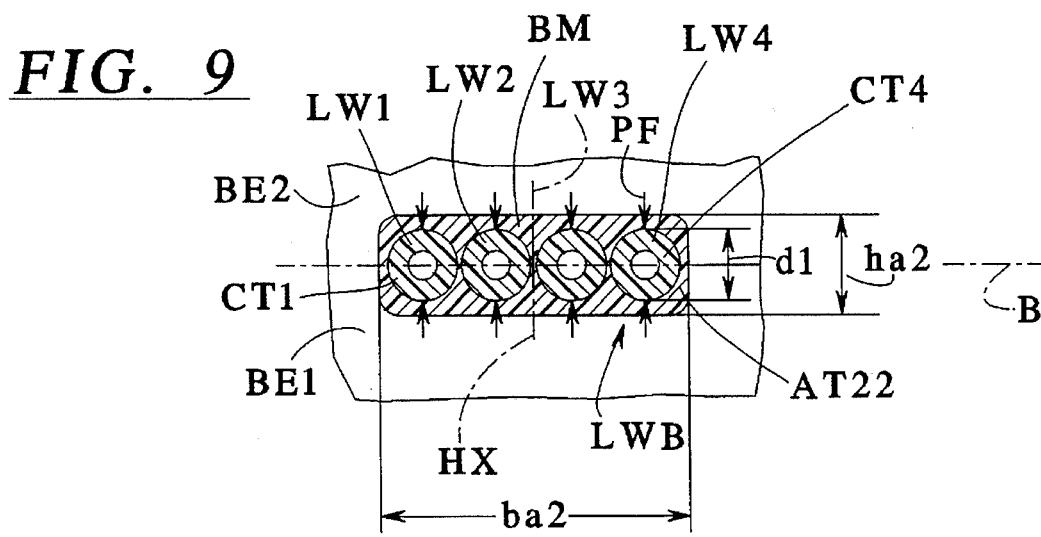
FIG. 9 is an enlarged cross sectional view through a ribbon conductor as it exits the apparatus of FIG. 1.

The principles of the present invention are particularly useful for forming a ribbon conductor, generally indicated at LWB in FIG. 9. The ribbon conductor, as illustrated, is composed of four light waveguides LW1 through LW4 with each of the waveguides having a coating CT1–CT4, respectively. Also, the ribbon conductor LWB has a layer of external coating material BM which acts to hold the various waveguides together in their desired position.

To obtain the ribbon conductor or stripline LWB, a coating means, generally indicated at BE in FIG. 1, is utilized. The coating means BE is composed of two identical parts BE1 and BE2 that are held together via a suitable connector means, for example screws, which pass through corresponding bores BO (FIG. 2) which are provided for this purpose. Given the coating means BE of FIG. 1, the light waveguides, for example LW1 through LW4, are supplied to an admission channel or funnel ET into an inner chamber IK in which a liquid coating material BM is supplied from an outside via an opening OM that is provided in the lower apparatus part BE1. The inner chamber IK has a first coating funnel or discharge channel AT1, which is an output channel on a discharge of the chamber IK and is composed of two sub-regions AT11 and AT12. After passing through the first coating funnel AT1, the waveguides are in a connecting region AK12 and then pass into a second coating or discharge channel AT2 that is composed of sub-regions AT21 and AT22.

Figure 3:
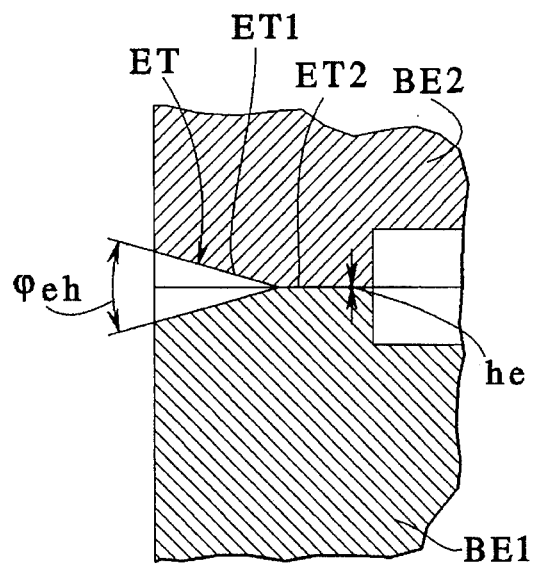
FIG. 3 is an enlarged cross sectional view of the admission funnel for the apparatus of FIG. 1.
Figure 4:
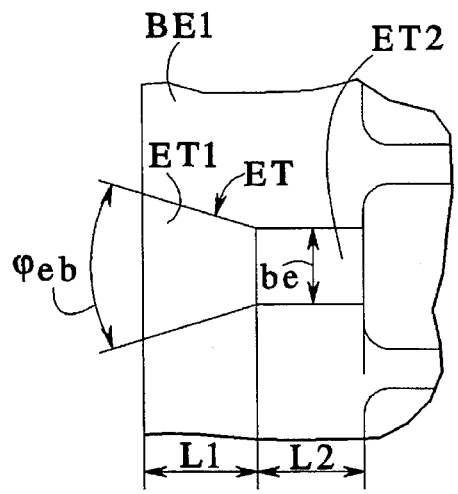
FIG. 4 is an enlarged portion of the plan view of FIG. 2 showing the admission funnel.

As best illustrated in FIG. 2, the coating means BE receives the plurality of light waveguides, such as the four waveguides LW1 through LW4, which enter from the left into the admission channel ET, wherein the admission channel ET comprises a rectangular cross section over its entire length. The first part ET1 of the admission channel ET is fashioned wedge-shaped and has an aperture angle $\phi$eh (see FIG. 3), which is in a vertical direction and is formed between the two coating parts or elements BE1 and BE2, as best illustrated in FIG. 3. As may be derived from the plan view of FIG. 4 of the element BE1, the width of the sub-region ET1 is, likewise, fashioned wedge-shaped and has an angle $\phi$eb in this funnel region. The following sub-region ET2 of the admission funnel ET has a rectangular cross section that remains constant and forms, basically, a rectangular tube whose height is referenced he in FIG. 3 and has a width be as illustrated in FIG. 4.

The sub-region ET2 of the admission funnel ET is also dimensioned so that the light waveguides LW1 through LW4 that are pulled through the rectangular opening lying side-by-side have adequate lateral play. When the outside diameter of the light waveguide, for example LW1, that is coated with a coating, such as CT1, that has an outer dimension d1 (see FIG. 9), then the relationship between be and d1, given n light waveguides, is to be selected as follows:

$$be = n(d1) + \Delta b \quad (1)$$

The width be should be greater than the value n(d1) by a plussage or excess of $\Delta b$, which amounts to 0.05 mm through 0.2 mm. Since this plussage or excess width defines the highest drag flow pressure and roughly corresponds to the thickness of the desired side cover layers on the light waveguides LW1 through LW4 of the coating material BM, the plussage is not dependent on the number of fibers.

The height he in the region of the constant rectangular cross section of the sub-region ET2 is, likewise, selected so that the light waveguides are guided having a spacing from the walls on both sides. What is valid for the height he is the formula:

$$he = d1 + \Delta h \quad (2)$$

The gap between the fibers and the tool discharge should expediently be approximately the same around the ribbon LWB (see FIG. 9) so that $\Delta h = \Delta b$ is a valid relationship.

The angles of the admission funnel ET1 are expediently selected so that $\phi$eh is between 10° and 20° and $\phi$eb is between 10° and 30°. The admission funnel ET, thus, fulfills the object of assuring an ordered admission of the light waveguides LW1 through LW4 in a side-by-side arrangement lying in a row and of building up the guide pressure, whereby an easy, low-friction sliding of the ordered light waveguides LW1 through LW4 within the sub-region ET2 is guaranteed by the correspondingly larger dimensioning of the cross section of the tubular sub-region ET2 as well.

The sub-region ET1, which is constructed wedge-shaped in two planes perpendicular to one another, as best illustrated in FIG. 4, comprises a length L1, whereas the tubular sub-region ET2, or rectangular tube, that form a box-shaped or cuboid opening has a path length L2. The length L1 is expediently selected at approximately 5 mm, whereas the length L2 lies between 0.5 mm and 6 mm. The lengths L1 and L2 should amount to a multiple of the ribbon width in any case. These values are independent of the number n of the light waveguides to be introduced and this also applies to the height he of the tubular sub-region ET2. By contrast thereto, the width be of the tubular sub-region ET2 is to be correspondingly enlarged given a greater number of light waveguides, which will be shown by the equation (1).

As may be particularly seen from FIG. 2, the tubular sub-region ET1 is followed by the inner chamber IK, whose cross section is preferably approximately rectangularly shaped. The length L3 of the chamber IK viewed in the throughput direction amounts to one- through three-times the ribbon width ba2 (FIG. 9). This chamber IK serves the purpose of supplying the coating material BM which first proceeds via an opening OM to the two outside chambers AK1 and AK2 that proceed parallel to the inside chamber IK. These outside chambers AK1 and AK2 are connected by cross chambers QK1 and QK2 to the inside chamber IK so that the coating material BM is supplied from the outside chambers AK1 and AK2 to the inside chamber IK and surrounds the light waveguides LW1 through LW4 on all sides therein. The largely liquid coating material BM also proceeds up to the tubular inlet part ET2 and into this part. A potential, extremely low admission pressure in the chamber IK is merely intended to avoid the entrainment of air. The entire guidance and centering of the light waveguides occurs from the drag flow pressure. The higher admission pressure would merely decenter or dislocate the light waveguides, for example press them against the walls at one side. The guidance of the light waveguides is still largely uncritical at this location in ET2.

Figure 5:
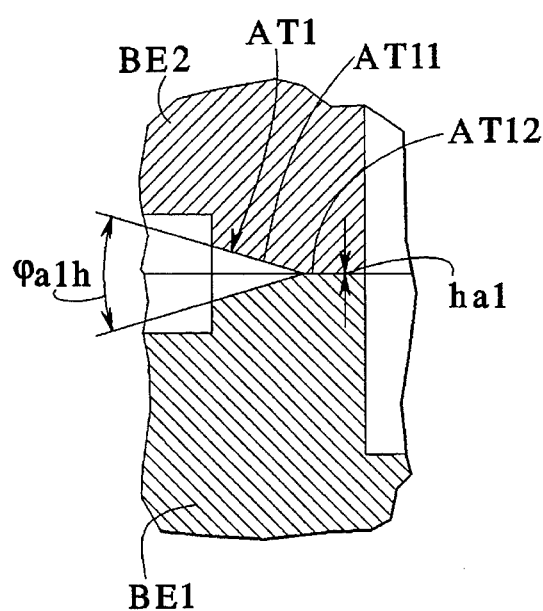
FIG. 5 is a partial enlarged cross sectional view of a first funnel or discharge channel of the apparatus of FIG. 1.
Figure 6:
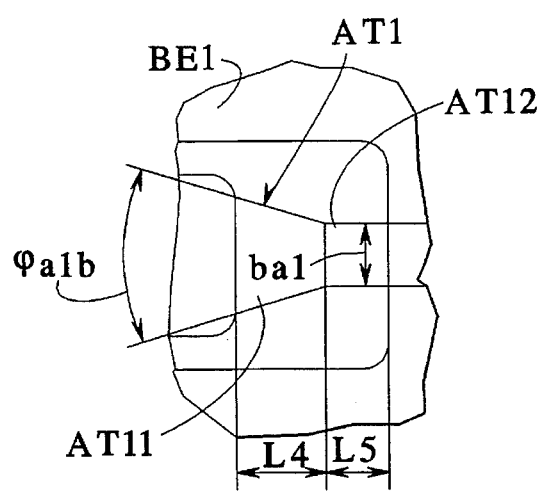
FIG. 6 is a partial enlarged plan view of the first funnel or discharge channel of FIG. 2.

A first discharge or funnel channel AT1, which is composed of two sub-regions AT11 and AT12, is provided at the discharge end of the inside chamber IK. Here, too, the cross section is selected to be rectangular over the entire length of the discharge channel AT1. Only the first sub-region AT11 is shaped wedge-like in two planes that are perpendicular to one another, and the following sub-region AT12 has a constant tubular cross section that forms the smallest cross section of the discharge channel AT1. The wedge-shaped sub-region AT11 has an aperture angle in height of $\phi a1h$, as illustrated in FIG. 5, and the angle of the width is referenced $\phi a1b$, as illustrated in FIG. 6. The following angular ranges are expediently accepted: $\phi a1h$ is between 5° and 20°, and is preferably 8°; and $\phi a1b$ is between 5° and 20°, and is preferably 8°.

Both angular values are independent of the number of light waveguides to be combined to form a ribbon conductor or stripline. The first part AT1 having the rectangular cross section as the discharge opening AT1 merges at its end into the tubular sub-region AT2, for example into the sub-region AT2 which does not change in cross section.

The sub-region AT2 has a height ha1 (FIG. 5), which is selected to be greater than the outside diameter d1 of the light waveguide so that the relationship of:

$$ha1 = d1 + \Delta h1 \quad (3)$$

is valid. It is expedient to select the plussage or excess $\Delta h1$ to be between 0.05 mm and 0.2 mm.

The sub-region AT12 has a width ba1 which is selected to have the relationship:

$$ba1 = n(d1) + \Delta ba1. \quad (4)$$

The value for $\Delta ba1$ lies approximately in the same range as the value of $\Delta h1$.

The light waveguides LW1 through LW4 should not touch the walls in the sub-region AT12. This is achieved by generating a drag flow in the region AT11 of the coating material BM, and this drag flow is set forth in greater detail with reference to FIG. 11.

The length of the wedge-shaped sub-region AT11 is referenced L4, wherein L4 is expediently selected between one through five times the ribbon width ba2. The length L5 of the tubular sub-region AT12 expediently lies between 0.2 mm and 10 mm.

The opening in the outlet side of the sub-region AT12 discharges into the cross channel AK12 that connects the side channels AK1 and AK2 to one another. A renewed feed of the coating material BM thus occurs in this location, and this is followed by a second discharge channel or coating funnel AT2 that effects the actual and ultimate positioning of the light waveguides before the curing of the applied coating material BM, which may be, for example, a resin. As a result thereof, the light waveguide ribbon conductor LWB is obtained as shown in FIG. 2a has the light waveguides LW1 through LW4 exit the device BE. In view of the splicing processes, it is necessary that every light waveguide always retain its defined position which is symmetrical relative to the outside contour of the ribbon conductor LWB with optimum precision within the envelope formed by the coating material BM.

Figure 7:
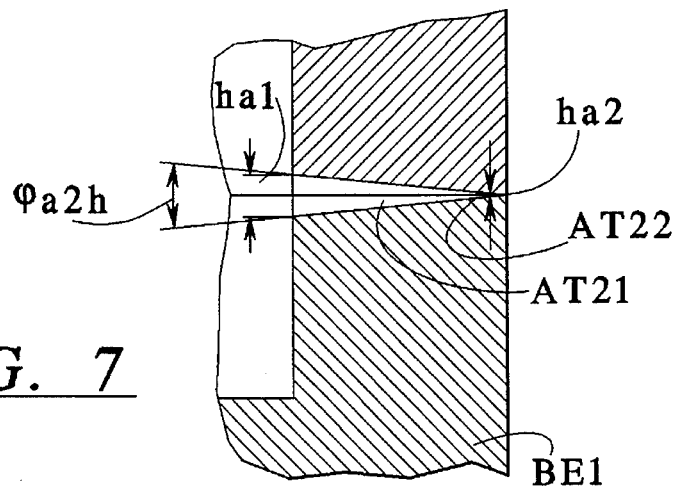
FIG. 7 is an enlarged partial cross sectional view of the second funnel or discharge channel of FIG. 1.
Figure 8:
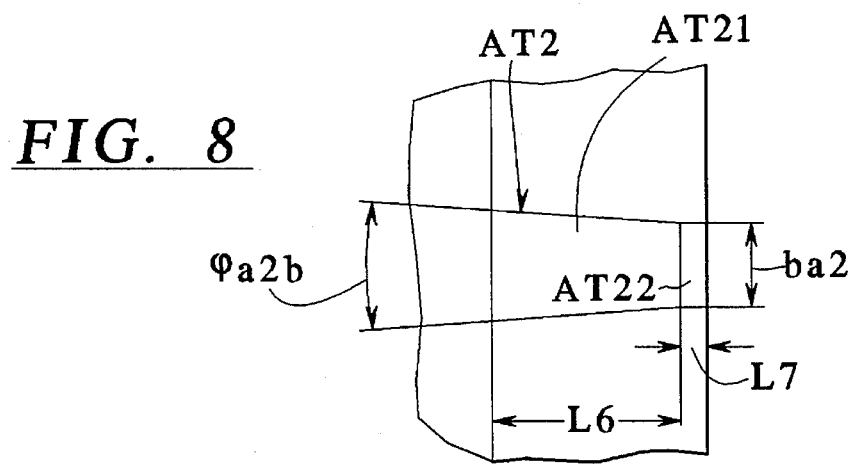
FIG. 8 is an enlarged partial plan view of the second funnel or discharge channel of FIGS. 1 and 2.

The ultimate centering and, thus, uniform distribution of the light waveguides within the envelope of the coating material BM that surrounds them occurs in the second discharge channel or funnel AT2 that, likewise, comprises two sub-regions AT21 and AT22. The wedge-shaped, first sub-region AT21 having a rectangular cross section over its entire length comprises an angle $\phi a2h$ in height (FIG. 7). The angle $\phi a2h$ is expediently selected to be in a range of between 5° and 20° and, preferably, is around 8°. The angle of this wedge-shaped opening in width, which is illustrated in FIG. 8 and in which width the light waveguides lie side-by-side, is referenced $\phi a2b$. This angle $\phi a2b$ has a range of, preferably, between 5° and 20° and is, preferably, also 8°. The width ba2 of the tubular sub-region AT22, which has a constant cross section, is selected by the equation:

$$ba2 = n(d1) + \Delta ba2.$$

It is expedient to select the excess or plussage $\Delta ba2$ to be at a value of between 0.05 mm and 0.2 mm.

The sub-region AT22 has a height ha2 (see FIG. 7) which is expediently selected according to the following relationship:

$$ha2 = d1 + \Delta ha2.$$

$\Delta ha2$ is, likewise, to be expediently selected in a range of between 0.05 mm and 0.2 mm. The values $\Delta ha2$ and $\Delta ba2$ define the thickness of the auxiliary coating on the light waveguides and, thus, define the outside dimensions of the light waveguide ribbon conductor LWB. The thickness of the auxiliary coating is expediently selected somewhat greater in both axes than corresponds to the desired ultimate condition because the volume shrinkage, for example during cross linking, can amount to approximately 15% through 20%.

A guidance of the light waveguides LW1 through LW4 that provides no rubbing contact with the outside surfaces even at the narrow, rectangular passages ET2, AT12 and AT22, is, thus, assured in the entire throughput region of the coating means BE. The positioning of the light waveguides is thereby continuously improved and, finally, the exit positioning is produced with particular precision at the rectangular opening or passage AT22. A wall spacing produced by the self-centering that supplies optimum results is always established for the light waveguides LW1 through LW4 in all of these narrow, tubular regions.

The invention not only provides that the light waveguides LW1 through LW4 are guided freely running through the coating means BE in the way already set forth, but also, additionally, provides that they only come into contact with the coating material BM. In addition, the optimum centering, which an exact observance of uniform attitudinal positions within the light waveguide ribbon LWB, is also assured in the invention by the longitudinal motion of the light waveguides to produce a drag flow of the liquid coating material BM. The light waveguides are pulled through the liquid coating material so that the latter is entrained by the light waveguides in the throughput direction, which is from left to right in FIGS. 1 and 2. The self-centering effect for the light waveguides is obtained by this drag flow of the liquid coating material, namely without having to press these light waveguides into a defined position from the outside with guide elements that mechanically contact the light waveguides and which would always cause an abrasion and/or deceleration of the light waveguides.

An enlarged front view of the outlet opening AT22 is shown in FIG. 9 and shows that the four light waveguides LW1 through LW4 are exiting this opening. The light waveguides LW1 through LW4 laterally touch so that they have their protective skin or coating CT1 through CT4 abutting laterally against one another, whereas a gap of constant width remains at the outside, and this is filled with the coating material BM. The coating material BM is also provided between the light waveguides LW1 through LW4 and the walls of the discharge opening AT22 above and below along the direction of the height ha2 of the gap AT22. Given proper dimensioning, the drag flow pressure is the same everywhere, as indicated by the arrows PF, so that the correct position of the light waveguides, which is their alignment, is necessarily produced. There is no drag flow between the individual light waveguides. The pressure is lowest in the gores or spaces therebetween, wherein, of course, there is a certain compensation that, however, does not lead to the elimination of the mutual contact. The light waveguides LW1 through LW4 thus lie symmetrically both with respect to the latitudinal axis BX as well as with respect to the height axis HX of the discharge opening AT22 or, respectively, the outside contour of the ribbon conductor or stripline LWB. This symmetry in height and width need not mean that the lateral coatings to the right and left, on the one hand, and the coatings above and below, on the other hand, must be of the same thickness. For example, the symmetry is also maintained when the respective coating material at, for example, the right and left is somewhat thicker than the bottom and cover layer or vice versa.

Figure 10:
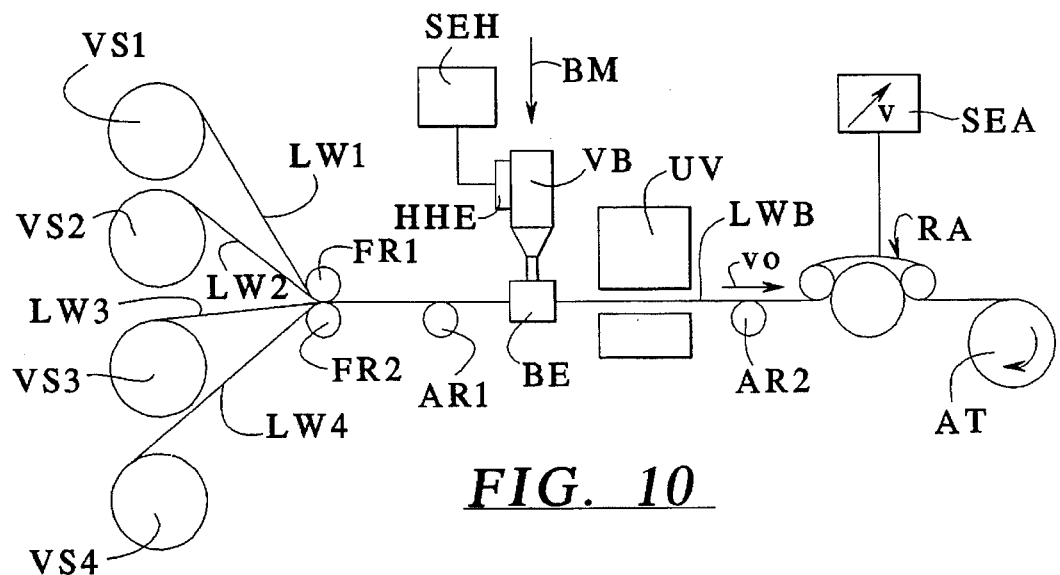
FIG. 10 is a schematic diagram of a production line having the apparatus for implementing the method of the present invention.

A production line in accordance with the present invention is illustrated in FIG. 10. The light waveguides LW1 through LW4 are taken from supply reels VS1 through VS4 and are brought together side-by-side in one plane via guide rollers FR1 and FR2. Following the guide rollers is a take-down roller AR1, which has the light waveguides LW1 through LW4 wrapped therearound and provides a designed position for the tensile stress to be provided at the outlet side. The fibers, after passing over the take-down roller AR1, extend through the coating means BE, wherein the coating material is applied. The coating material is stored in a liquid form in a corresponding reservoir VB. The coating means BE is followed by an ultraviolet lamp UV that, when using a curable resin as a coating material, will assure a rapid curing of the coating. The light waveguide ribbon LWB obtained in this way is then wrapped around a further take-down roller AR2 and is supplied to a pulling device RA, which is illustrated as a caterpullar-type puller utilizing a continuous belt coacting with a roller. From this device RA, the ribbon or band is fed to a take-up drum AT or the like. The take-down roller AR1 is decelerated so that the light waveguides LW1 through LW4 pass through the coating means BE under tension. The tensile stress per light waveguide at the haul-off should not be selected higher than 1N, but should amount to at least 0.3N. This tensile force is offered by the pulling device RA, which is equal to the haul-off braking power at AR1 plus the coating force at BE.

The static admission pressure in the coating means BE should become as low as possible. It has been shown, namely, that a higher pressure is more likely to contribute to decentering or disalignment and, thus, a de-symmetrization of the light waveguides within the ribbon LWB. The cause is believed to be that the flow generated by the high external pressure has a decentering effect, which will more likely displace the light waveguides in a direction toward a side wall due to the increased pressure. Thus, correspondingly large gaps appear at the opposite side wall. The pressure should, thus, be selected only of such a height that adequate liquid coating material BM is present in the individual chambers of the coating means BE and that no air can be entrained from the inlet side of an admission opening ET. Expediently, the pressure value lies between $10^4$ and $10^5$ Pa.

It is to be assumed with respect to the viscosity of the coating material BM that a lower viscosity material requires a higher throughput rate vo for producing a drag flow than does a higher viscosity material. Roughly stated, approximately the flow allocations can be made:

$$\text{Viscosity } \eta \approx \frac{1}{vo} \quad (5)$$

wherein vo denotes the velocity of the optical fibers when traversing the coating means BE.

Also valid are the relationships:

$$\eta = \text{viscosity} \left[ \frac{N \cdot s}{m^2} \right]$$

$$\gamma = \text{shearing speed} = \frac{dv}{dr} \left[ \frac{m}{s} \cdot \frac{1}{m} = \frac{1}{s} \right]$$

$$\tau = \text{shearing strain} \left[ \frac{N}{m^2} \right]$$

whereby the area $m^2$ lies in the same direction as the force. Thus, $$\tau = \eta \cdot \gamma = \eta \cdot \frac{dv}{dr} \quad (6)$$

-continued and $$\eta = \frac{\tau}{\dot\gamma} \quad (7)$$

With a given viscosity of the coating material BM, the drag flow for obtaining an adequate centering of the light waveguides within the ribbon can be set in a simple way so that the haul-off velocity vo of the pulling device RA according to FIG. 10 is varied by an appropriate control means SEA until the desired centricity of the light waveguides is guaranteed within the envelope formed by the coating material BM. The banking-up pressures become all the higher and the centering effect becomes all the better the higher the velocity vo.

When work is to be carried out with a given throughput velocity vo, then there is also the possibility of correspondingly setting the viscosity of the coating material BM. To this end, a heater means HHE can be provided, for example, on the reservoir VB. This heater means HHE is controlled by a control means SEH. Shearing strain and banking-up pressure can be lowered by lowering the viscosity and can be correspondingly raised on the basis of an increase of the viscosity.

Figure 11:
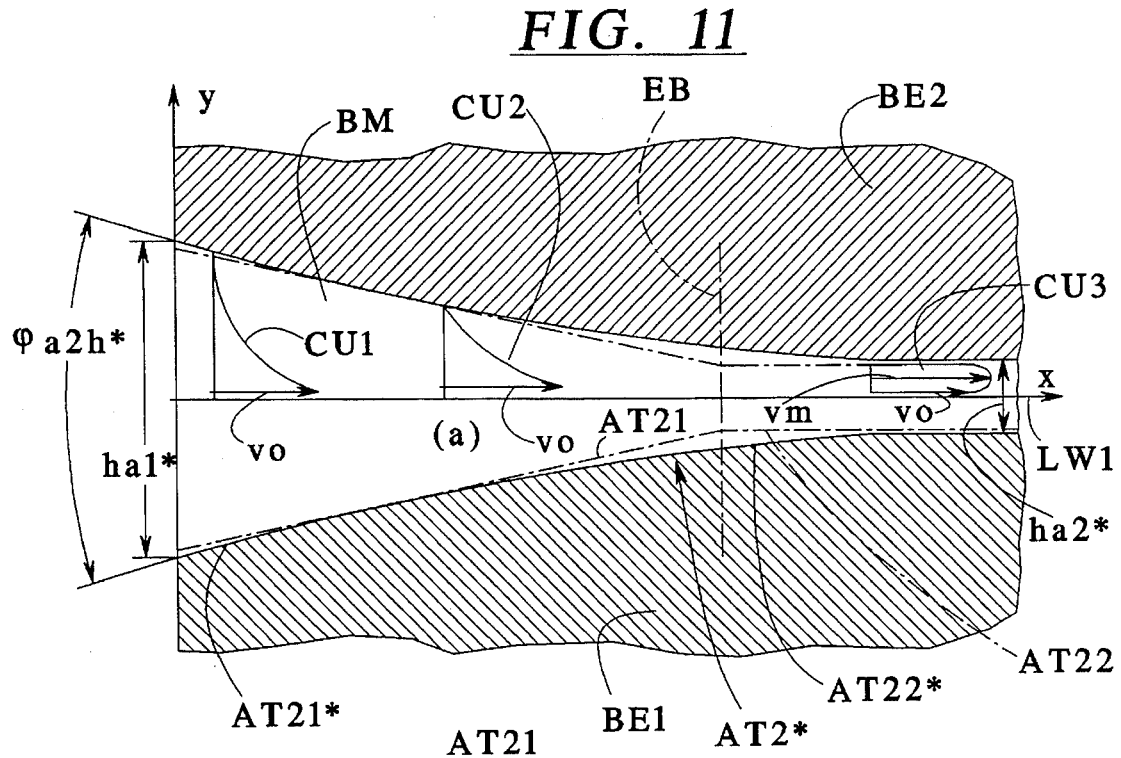
FIG. 11 is an enlarged coating funnel diagrammatically illustrating the creation of the drag flow.

The relationship in view of drag flow of a first waveguide LW1 of the four light waveguides is shown in FIG. 11, given a throughput direction from left to right. The other waveguides LW2 through LW4 are to be imagined as being arranged in a plane extending perpendicular to the plane of the drawing and including the waveguide LW1. Whereas the limiting walls at the discharge channel AT2 in FIGS. 7 and 8 proceed in straight lines, these limiting walls are entered as continuous, steadily curved lines in the present example for explaining the theoretical relationships. The discharge channel AT2* is thereby composed of a left-hand, larger sub-region AT21* that corresponds to the wedge-shaped region AT21 of FIGS. 7 and 8. Subsequently, the approximately exponentially proceeding curve of the wall limitation merges into a right-hand part that becomes increasingly flatter and is referenced AT22*, and this is comparable to the tubular or rectangular sub-region AT22 of FIGS. 7 and 8. After the end of the start-up process, the coating material BM in the proximity of the light waveguide LW1 passing through is respectively of approximately the same speed as this, i.e., has the velocity vo. By contrast thereto, the velocity of the coating material in the region of the outer wall of the discharge channel AT2* is zero, whereby an approximately parabolically descending curve CU1 occurs for the velocity in the entry region. For example, at the left-hand opening of the channel AT2*, the parabola axis thereby lying in the y-direction. Over the further course, for example with increasing constriction of the channel AT2*, the course of the curve CU1 becomes steeper and approximately approaches a straight line that is referenced CU2 at position a in FIG. 11. The velocity at the outside, i.e., in the region of the outer wall of the parts BE1 and BE2 of the coating means, still continues to remain approximately zero. A distribution of the velocity that is reproduced by the curve CU3 that roughly corresponds to a parabola having an axis parallel to the x-direction occurs with increased constriction. The velocity vo continues to remain in the region immediately at the light waveguide LW1. Above this, however, there is a velocity region whose velocity is higher than vo, and the velocity is again zero in the region of the wall surface of the through opening AT2*. The velocity vm occurs somewhere in the forward direction, and this velocity vm is higher than the velocity vo and represents the creation of a drag flow which causes the centering of the light waveguide within the gap AT2*. The creation of the aligning drag flow is, thus, characterized by the velocity region within the coating material BM that have a higher value than the throughput velocity vo of the light waveguides LW1 through LW4. This creation is caused by the entrainment of the coating material BM due to the increasing constriction of the exit channel AT2* as a consequence of the movement of the light waveguides toward the right with the velocity vo.

The following theoretical considerations and derivations serve the purpose of illustrating this situation. We thereby proceed on the basis of the following assumptions:

The flow volume is of the same size at every location of the discharge opening AT2*. It is also valid that the original drag flow is undisturbed at an arbitrary location on the x-axis by the superimposed pressure flow that occurs from converted drag flow and that the viscosity is dependent neither on the compressive strain nor on the shearing strain.

Drag flow volume is increasingly converted into pressure flow volume in the flow direction with decreasing width of the gap of the discharge channel AT2*. Since the continuity (coherency) criterion: deviation only due to "stripping" preceding the location (a) or the (weak) compression following the location (a) must be preserved, a zone of underpressure increasing with increasing distance from the position (a) opposite the flow direction forms in front of the position (a). This under-pressure can only be compensated by an over-pressure. The application of an external pressure, which is applied in the region of the admission opening OM of the coating material BM of the device of FIG. 1 is expedient only to this extent. The following determinations are valid:

$L$ = length element of the not-yet joined together light waveguide arrangement [$m$]

$dP$ = differential of the topical pressure $\left[ \frac{N}{m^2} \right]$ $\eta$ = viscosity $\left[ \frac{N \cdot S}{m^2} \right]$ $\gamma$ = shearing speed = $\left[ \frac{m}{s} \cdot \frac{1}{m} \right] = \frac{1}{s}$ $\tau$ = shearing strain $\left[ \frac{N}{m^2} \right]$ wherein the area $m^2$ lies in the same direction as the force.

What is valid for an exclusive pressure flow for $L \gg y_0$:

$$\tau = dP \cdot L \cdot 2 \left( \frac{y_{ox}}{2} - yx \right) \cdot \left( \frac{1}{2 \cdot L \cdot dx} \right), \text{ also} \quad (8)$$
(effective force) $\qquad$ (shearing section)

i.e.

$$\tau = \frac{dP}{dx} \cdot \left( \frac{y_{ox}}{2} - yx \right) \quad (9)$$

$\frac{dP}{dx}$ must be the same over the gap at every location having the same x-coordinate.

On the other hand, $$\tau = \eta \cdot \gamma = \eta \cdot \frac{dv}{dy} \quad (10)$$

so that (9) and (10) yield $$\eta \cdot \int_{v=o}^{v=vmax} dv = \frac{dP}{dx} \cdot \int_{y=o}^{y=\frac{y_o}{2}} \left( \frac{y_{ox}}{2} - y_x \right) dy \qquad (10a)$$

$$\eta \cdot v_{max} = \frac{dP}{dx} \left( \frac{y_{ox}^2}{4} - \frac{y_{ox}^2}{8} \right) = \frac{dP}{dx} \cdot \frac{y_{ox}^2}{8} \qquad (11)$$

is $$\eta \cdot v = \frac{dP}{dx} \left( y_x \cdot \frac{y_{ox}}{2} - \frac{y_x^2}{2} \right). \qquad (11a)$$

up to an arbitrary y.

However it may be generated, the volume of this "inner" pressure flow (drag flow) is $$Q_P = \int_{y=o}^{y_o} v \cdot dy \cdot L = \frac{dP}{dx} \cdot \qquad (12)$$

$$\frac{L}{\eta} \int_{y=o}^{y_o} \left( y_x \cdot \frac{y_{ox}}{2} - \frac{y_x^2}{2} \right) dy$$

$$Q_P = \frac{dP}{dx} \cdot \frac{1}{\eta} \cdot \frac{y_{ox}^3}{12} \cdot L \left[ \frac{N}{m^2} \cdot \frac{m^2}{Ns} \cdot m^3 = \frac{m^3}{s} \right] \qquad (13)$$

This pressure flow derives from the difference between the drag flow at the location (a) and the drag flow at an arbitrary location.

$$Q_P = Q_{sa} - Q_{sx} = \frac{vo}{2} (y_{oa} - y_{Dx}) \cdot L \qquad (14)$$

$$= \frac{dP}{dx} \cdot \frac{1}{\eta} \cdot \frac{y_{ox}^3}{12} \cdot L$$

Equation (14) can be integrated when $y_o$ (x) is known.

$$\int_{p=o}^{P} dP = 6 \, vo \cdot \eta \cdot \int_{x=a}^{x} \frac{y_e - y(x)}{y(x)^3} \cdot dx \qquad (15)$$

This pressure becomes all the higher the smaller y(x) is, whereby the linear reduction of the gap thickness results in an extremely steep pressure rise.

The absolute size of this pressure reacts sensitively to a diminishing or enlarging gap thickness and compels the central position or symmetry of the fibers. Since the ideal limiting curve, as illustrated in FIG. 11, can only be produced with great outlay and cost, it is replaced in practice by a sequence of sub-sections that approximate the ideal function as closely as possible.

In the simplest of all cases, a wedge-shaped gap AT21 (FIG. 7), whose aperture angle φa2h is expediently selected in a range of between 2° and 10°, and preferably around 8°, is utilized. This shape AT21 is illustrated in dot-dash lines in FIG. 11 and has proven, based on the manufacturer, to be an approximately to the polynomial or, respectively, ideal curve AT2*. The pressure distribution is then, in fact, not constant over the gap length but increases from left to right slightly because of the wedge-shaped gap AT21, which has a smaller cross section in comparison to the ideal curve.

Beginning with the plane EB, the tubular section AT22 with constant cross section follows as approximation, since the ideal curve AT2* proceeds substantially flatly in this region. The pressure is, in turn, largely dismantled here because of the constant cross section.

In order to noticeably improve the centering effect, this process can be undertaken twice in two wedge gaps aligned toward one another but separated from one another. The first wedge gap is shown in FIGS. 5 and 6 and is referred to AT11, and the second is shown in FIGS. 7 and 8 and bears the reference AT21. As a result thereof and due to the inherent stiffness of the fibers, an excellent centering is produced and, at the same time, air potentially entrained via the admission opening ET is reliably stripped off of the fibers.

The admission channel ET1 serves only the purpose of a slight pre-ordering of the light waveguides. A first ordering or symmetrical positioning of the light waveguides occurs with a drag flow in the first discharge channel or coating funnel AT1, and this is further improved in the second discharge channel or second coating funnel AT2 by a further drag flow. The pressure area over the tool length is symmetrically identical given a perfectly symmetrical positioning. Given a potential de-adjustment, it becomes higher at the thinner gap and lower at the thicker gap so that the correction automatically occurs. The following tubular part, for example AT22, can be made all the shorter the longer the wedge-shaped region AT21 is selected and vice versa, as may also be seen from AT11 and AT12 in FIG. 2.

As a result of the gores or spaces between the light waveguides, the lines of equal velocity round about the conductor structure composed of the four light waveguides LW1 through LW4, of course, do not proceed on a straight line, but somewhat in the gore region. This means a certain transverse pressure compensation that, due to the wedge shape in the x-direction, which is the longitudinal direction of the light waveguide, however, only causes a certain longitudinal shift, i.e., in the x-direction of the points of equal pressure. A defined drag velocity is thus achieved somewhat later in the gore region given a larger x than in the non-gore region. Since this is valid up to the discharge in the tubular region AT22, the aligning outside pressure is maintained up to the end.

It is provided in the method of the preceding Figures that the discharge channel tapers in the same way in height, i.e., perpendicularly relative to the lateral or latitudinal axis of the ribbon conductor or stripline as does the angle that lies in the lateral axis of the ribbon conductor. The centering forces due to the drag flow which the light waveguides experience in the direction of the lateral axis of the ribbon become all the lower, however, the greater the plurality of light waveguides, for example ribbon conductors having 16 light waveguides arranged side-by-side, which are currently known.

A development of the invention is based on the object of achieving an improvement with respect to the force of the drag flow. This is inventively achieved in a method of the species initially cited in that the discharge channel serves the purpose of producing the drag flow taper more greatly perpendicularly relative to the lateral axis of the ribbon conductor or stripline than in or along the lateral axis of the ribbon conductor or stripline.

As a result of such an asymmetrical design of the taper, an increase in the forces caused by the drag flow is achieved in the region of the lateral axis of the ribbon conductor because of the reduced taper and, thus, of the lower angular value. This is expressed in an improvement of the centering of the light waveguides within the light waveguide ribbon. It is expedient with a taper angle of the discharge channel perpendicular to the lateral axis be selected two to four times as great as the angle of the discharge channel along the lateral axis of the ribbon conductor, namely referred to a respective plane perpendicular to the light waveguide ribbon and to the longitudinal axis thereof.

It is generally true that the angular values perpendicular to the lateral axis of the ribbon conductor are expediently selected all the greater with the greater number of light waveguides within the ribbon. Given four light waveguides per ribbon, it will still generally be adequate to select the taper angle of the discharge channel in the latitudinal axis of the ribbon conductor approximately of the same size as the taper angle perpendicular to the latitudinal axis. In FIGS. 5 and 6, as well as 7 and 8, these angles are referenced $\phi a1h$, $\phi a2h$ perpendicularly relative to the latitudinal axis and $\phi a1b$ and $\phi a2b$ along the latitudinal axis.

Given eight light waveguides per ribbon, it is expedient to select these angles differently wherein the discharge channel advantageously comprises approximately angle values of between 6° and 10° perpendicular to the latitudinal axis of the ribbon conductor, whereas the angle of the tapering discharge channel is expediently selected between 3° and 4° along the latitudinal axis of the ribbon conductor. When 16 light waveguides are provided per ribbon, it is expedient when the angle perpendicular to the latitudinal axis of the ribbon conductor is selected between 8° and 12°, with the preferred angle being 10°. The angle along the latitudinal axis of the ribbon conductor in the discharge channel expediently amounts to about between 3° and 5°, with the preferred angle being 4°.

When a tapering admission channel is employed in addition to the discharge channel or channels, then it is expedient to also asymmetrically design this admission channel given a greater plurality of light waveguides within the ribbon in this way, as well. Thus, the admission channel serves the purpose of generating the drag flow tapers more greatly perpendicularly relative to the latitudinal axis of the ribbon conductor along the latitudinal axis of the ribbon conductor. Numerically, approximately the same values are advantageously employed, as already set forth above in conjunction with the design of the discharge channel.

The development of the invention is also directed to an apparatus for the implementation of the method of the invention, this being characterized in that the taper of the admission channel perpendicular relative to the latitudinal axis of the ribbon conductor or stripline is selected larger than the taper of the walls of the discharge channel along the latitudinal axis of the ribbon conductor.

Figure 12:
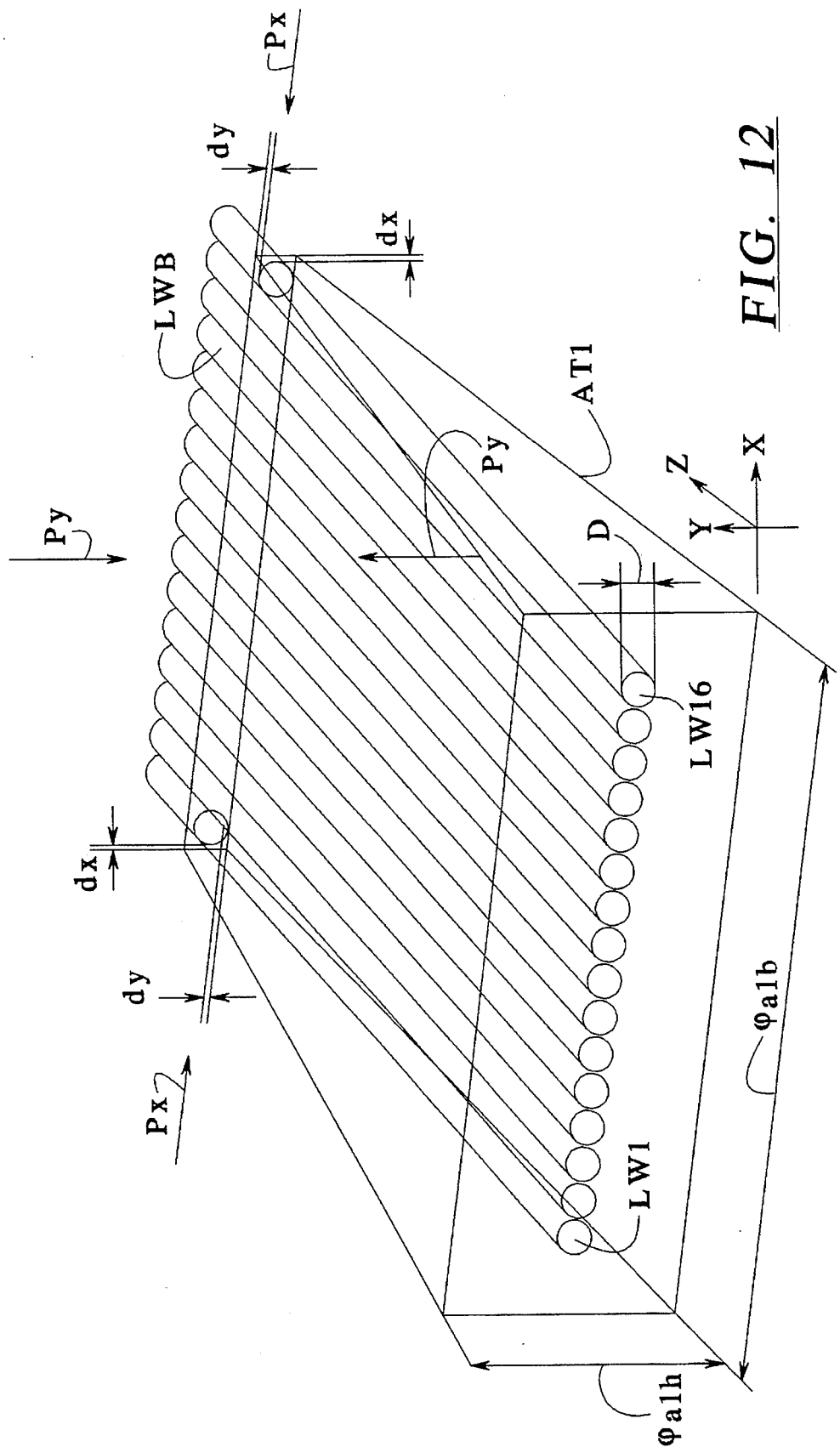
FIG. 12 is a perspective view of the asymmetrically fashioned discharge channel.

As an exemplary embodiment thereof, FIG. 12 shows a perspective view of a discharge channel that, for example, corresponds to the discharge channel AT1 of FIG. 2 and is traversed in the z-direction by light waveguides LW1 through LW16. The comments are also valid in the same way for the second discharge channel AT2 of FIG. 2, whereby the reference characters in the first discharge channel have been taken over for FIG. 12 in the present example. The aperture angle of the discharge channel AT1 respectively tapering wedge-shaped is referenced $\phi a1b$ along the direction of the latitudinal axis x, whereas the aperture angle of the discharge channel AT1 perpendicular relative to the latitudinal axis x, i.e., in the direction y, amounts to $\phi a1h$. As may be seen from FIG. 12, the two angles $\phi a1b$ and $\phi a1h$ are selected different, so that an asymmetrical admission channel AT1 occurs. In detail, the angular values are defined so that the discharge channel AT1 tapers more greatly and proceeds more steeply perpendicularly relative to the latitudinal axis x of the ribbon conductors LWB, which is the x-direction, than in the latitudinal axis y of the ribbon conductor. The angle $\phi a1h$, which is in the y-direction is, thus, selected larger than the angle $\phi a1b$, which is in the x-direction. In this way, the dragged pressure in the x-direction, which is the force Px generated as a consequence of the drag flow, becomes greater than the force Py that acts perpendicular relative to the lateral axis of the ribbon conductor LWB. As a result thereof, an excellent centering and uniform arrangement of the light waveguides within the light waveguide ribbon LWB is assured, even given a relatively great plurality of light waveguides, for example 16 light waveguides LW1 through LW16, as illustrated.

The conditions, however, are different in the x-direction, i.e., in the latitudinal axis of the ribbon LWB. In the worst case, the diameters given 16 light waveguides LW1 through LW16 for the tolerance value dD sum up to 16·3 µm=48 µm so that the discharge opening at the end of the discharge channel AT1 is to be dimensioned correspondingly larger in the latitudinal axis x in order to assure a tolerance compensation here without having the light waveguides graze the side walls. When one proceeds on the consideration that the exit aperture is to be selected larger by a certain percentage, for example by 10% in the x-direction, then the maximum value of the lateral expanse of the 16 light waveguides LW1 through LW16 is to be based here with 16(180+3)=2928 µm. This value is then to be selected greater by 10% of D in order to obtain the exit aperture, namely as 2928+18=2946 µm. Compared to the ideal diameter D, thus, the gap dx is respectively larger than the gap dy.

When, instead of working with a wedge-shaped discharge channel, which discharge channel is equipped with constant aperture angles $\phi a1b$ and $\phi a1h$, one works with a discharge channel whose wall is fashioned steadily curved according to FIG. 11, then the fundamental consideration analogously apply for a respective plane of sections perpendicular to the light waveguide axis. This means that the curvature or, respectively, the tangent viewed in the z-direction respectively has a larger angle in the x–y plane perpendicular to the latitudinal axis, for example at the top and the bottom in the drawing and the upper wall or, respectively, lower wall, than the tangent in the latitudinal axis, i.e., right and left in the drawing, as side walls.

The light waveguides are supplied to the coating means of the preceding Figures coming from air and they come into contact with the coating material for the first time in the coating means itself. Particularly given extremely high throughput speeds and/or a great plurality of light waveguides within the light waveguide ribbon, air bubbles are entrained from the outside into the coating means to a certain extent. Some of these bubbles are still contained in the coating material at the output and, thus, remain in the light waveguide ribbon. This can lead to inhomogeneities structure, which is undesirable. Further, there is the risk that the greater quantities of air will form over time in the inside of the coating means.

A development of the invention is, therefore, based on the object of disclosing a way of how these difficulties can be countered in a simple way. In a method of the species initially cited, this object is achieved in that the coating material is conducted past the light waveguides opposite the throughput direction of the light waveguides and is eliminated toward the outside in that at least a part of the coating material passes along the light waveguides practically in an inverse or reverse flow principle, it is extremely difficult for the air bubbles to move forward all too far in the throughput direction of the light waveguides. Undesirable accumulations of air as well as inclusions of air bubbles in the actual envelope of the light waveguide ribbon are consequently largely suppressed by the invention.

According to an advantageous development of the invention, the light waveguides are previously additionally conducted through a vacuum chamber in which an underpressure or vacuum is applied to the light waveguides. This under-pressure vacuum or suction assures that only an extremely small number of air bubbles will penetrate at all up to the region wherein the coating material is present.

The invention is also directed to an apparatus for manufacturing an optical ribbon conductor or stripline which is characterized in that the overflow unit is provided preceding the actual coating means, and this overflow unit is connected via at least one connecting channel to the region of the coating means that contains the coating material.

Figure 13:
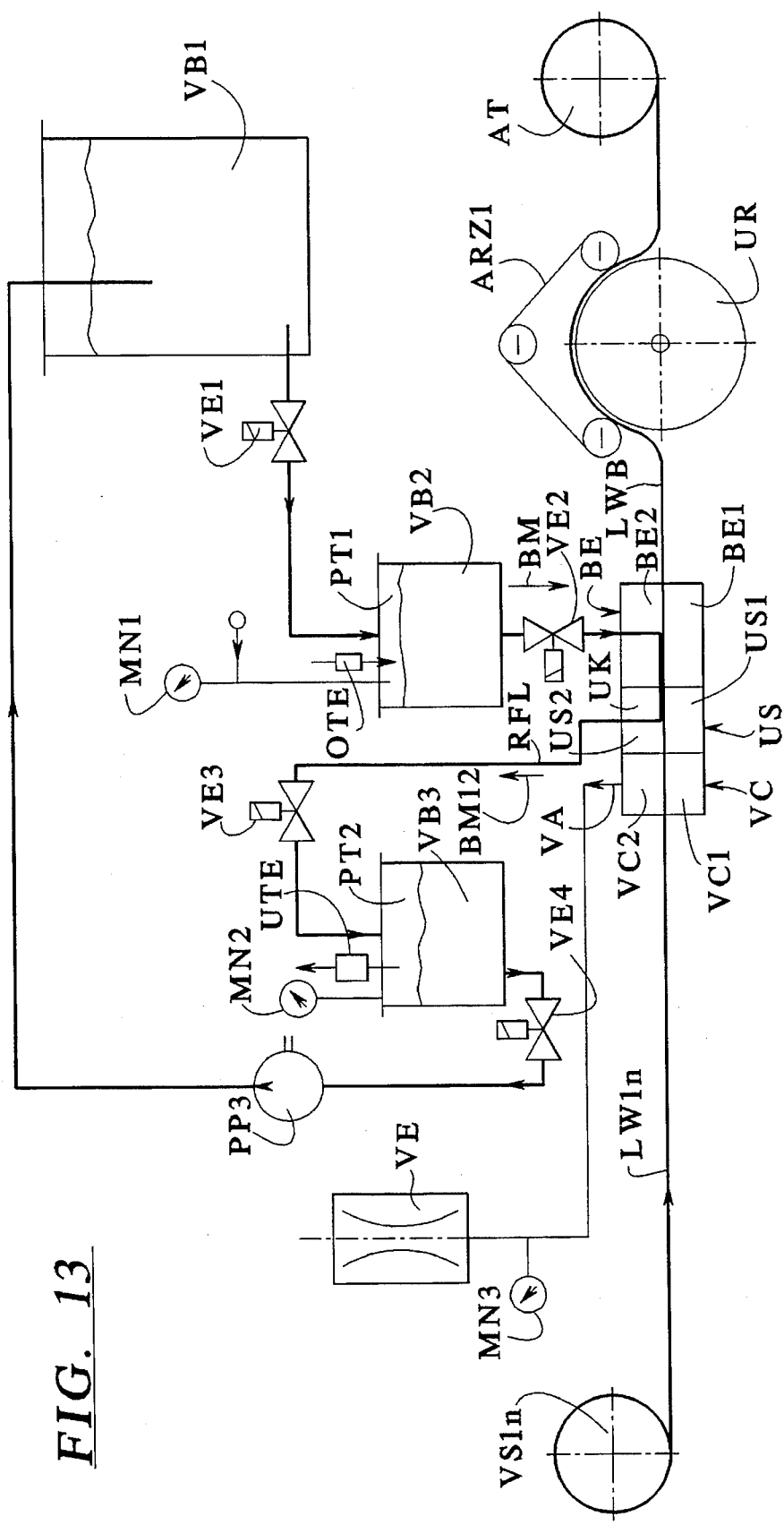
FIG. 13 is a diagrammatic view of another apparatus for forming the present invention.
Figure 14:
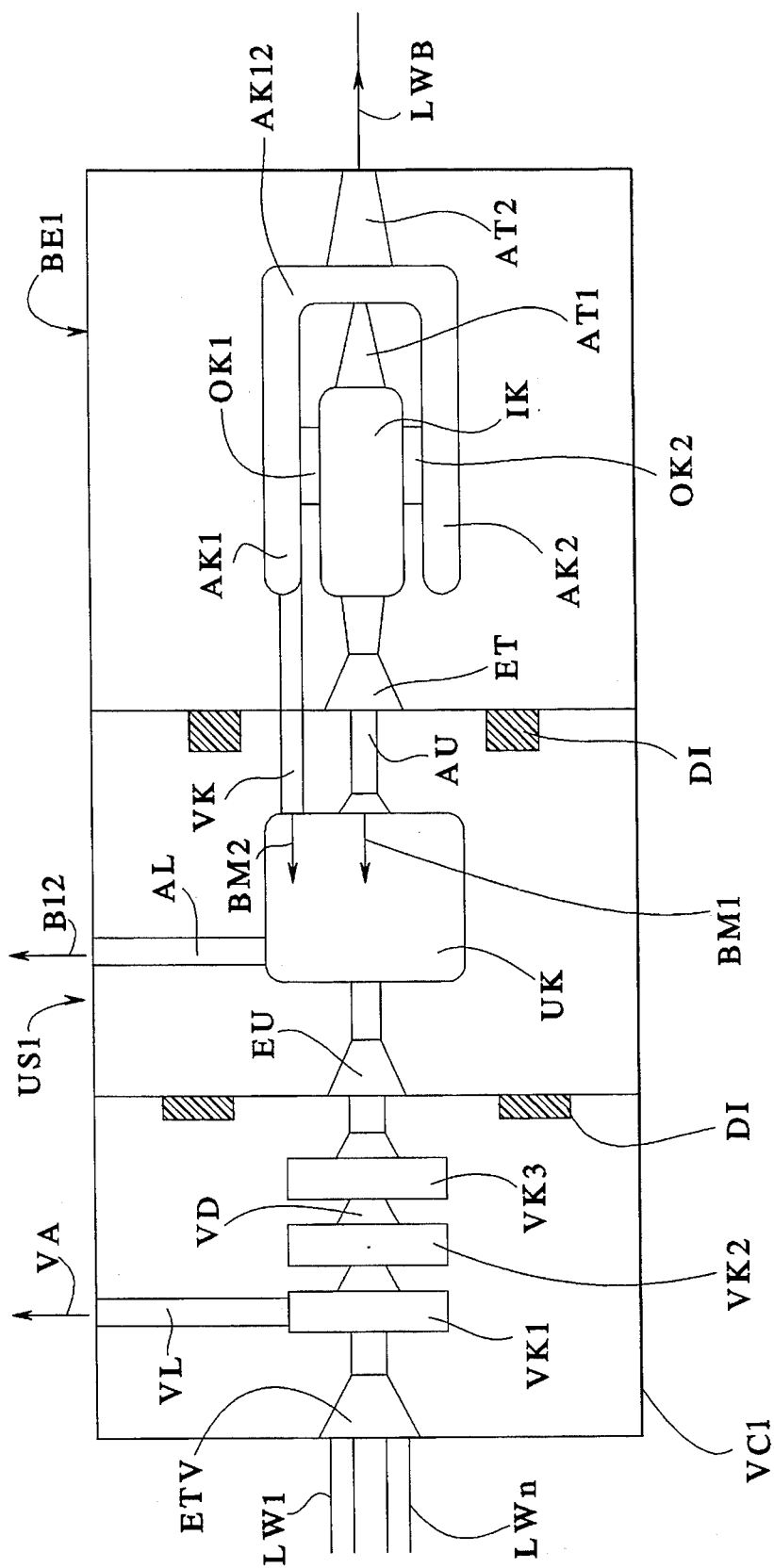
FIG. 14 is a plan view of the coating apparatus utilized in the apparatus of FIG. 13.

The coating means of FIG. 13 shows a more detailed illustration of details of the design of the production line of FIG. 10. Insofar as they agree, the reference characters employed therein are also employed here for the identical or corresponding parts. A number of supply reels VS1n arranged side-by-side and, thus, extending on an axis perpendicular to the plane of the drawing, will deliver a plurality of light waveguides LW1n lying side-by-side. First, these waveguides LW1n enter into a vacuum unit VC, whose more detailed structure is shown in FIG. 14. This vacuum unit VC is followed by an overflow or return unit US, whose details are also described and shown hereinafter. The coating means BE then follows. The units VC, US and BE are each, respectively, constructed of two halves VC1, VC2; US1, US2; BE1, BE2 that are joined in a parting line which coincides with the throughput plane of the light waveguides LW1n. The structure of the respective halves VC1, VC2, as well as US1, US2 and BE1, BE2 are respectively selected to be the same in mirror images. The elements VC, US and BE are mechanically united to form a block and, for example, are connected to one another with screws. The light waveguides LW1n provided with the common envelope finally leave the coating means BE as a light waveguide ribbon LWB and are supplied by the pull-off, which includes continuous belts ARZ1 coacting with a revolving roller UR to a wind-up drum AT.

The coating material BM is contained in a reservoir VB1 that is in communication with a second reservoir VB2 via a conduit containing a valve VE1. The reservoir VB2 is expediently connected to a heating means that is held at a temperature that is exactly matched to the coating process. In addition, a defined, relatively low over-pressure PT1 that effects the conveying of the coating material BM into the coating means BE is generated with a pressure means OTE. A manometer MN1 is provided for measuring the over-pressure. An additional valve VE2 is provided at the outlet of the reservoir VB2. The coating material BM first proceeds into the coating means BE that corresponds to the coating means having the same reference characters in FIGS. 1 and 2. The centering of the light waveguides and their all around envelopment with the coating material BM are implemented therein. It is additionally provided, however, that a part of the coating material BM will flow along the light waveguides LW1n opposite the throughput direction of the light waveguides and proceed into an overflow or return unit US, whose details are shown in FIG. 14. A part BM 12 of the coating material BM is taken from this overflow unit US and is supplied through a valve VE3 to a reservoir VB3. Since air bubbles may also be contained in the returning coating material BM12 under certain circumstances, an under-pressure PT2 is applied to the reservoir VB3, the extraction means UTE is provided for this purpose. The under-pressure respectively prevailing at the reservoir VB3 can be continuously identified with a manometer MN2 and the value of this under-pressure is in a range of 0.1 bar to 0.5 bar. Excess coating material BM12 is taken from the reservoir VB3 via a valve VE4 and a conveying pump PP3 and is then returned to the main reservoir VB1.

In order to avoid dragging air bubbles into the coating means to the farthest-reaching extent from the outset, an under-pressure or vacuum unit VC is also provided before the overflow or return unit US. This under-pressure or vacuum unit VC has a vacuum applied thereto by an extraction means VE. The size of this under-pressure or vacuum is identified with the manometer MM3. The under-pressure expediently lies in the order of magnitude of 0.2 bar through 0.5 bar, and is preferably 0.3 bar.

The right-hand part of FIG. 14 shows the lower half BE1 of the coating means BE of FIG. 13. The structure corresponds to that of FIGS. 1 and 2. The delivery of the coating material BM occurs via a delivery channel lying in the depths that is in the communication via connecting channels OK1 and OK2, both with the inside channel IK as well as the two outside channels AK1 and AK2 that proceed approximately parallel. These channels AK1 and AK2 are also connected to one another in an outlet region via the transverse channel AK12. The entire region of the elements AK1, AK12, AK2 and IK fashioned as depressions as well as the admission funnel ET and the outlet funnels AT1 and AT2 are filled with coating material. A connecting channel VK, by which a part of the coating material indicated by the arrow BM2, proceeds into a chamber UK of the return unit US provided between the outside channel AK1 and the overflow unit US lying ahead of the actual coating means. Another part BM1 of the coating material proceeds via the admission funnel ET and the outlet funnel AU into the chamber UK, and this amount BM1 is moving in the opposite direction of the light waveguides LW1 through LWn that are passing through the device. This part BM1 of the coating material flows from right to left in an "inverse flow principle" opposite the throughput direction of the light waveguides creates a type of "stripping effect" for the air bubbles that are entrained by the light waveguides LW1 through LWn. These air bubbles are, thus, prevented from entering into the actual coating means BE. An overflow channel AL, by which all of the excess coating material BM12 can flow out of the unit US and, thus proceed into a reservoir VB3, is connected to the chamber UK of the preliminary or overflow unit US. The forward motion of the coating material through the coating means BE up to the preliminary stage or overflow stage US and, finally, up to the reservoir VB3 is effected by the over-pressure PT1 in the reservoir VB2. The preliminary or overflow stage US is connected in a suitable way to the actual coating means BE, for example with appropriate connecting screws, wherein a seal is obtained by a seal DI in the region of the end faces of the preliminary stage US1 and an emergence of the coating material is, thus, prevented.

Another improvement with respect to the entrainment of the air bubbles can be achieved by the vacuum unit VC that is arranged preceding the overflow unit US. The bottom part VC1 of the under-pressure or vacuum unit VC, which is fashioned in two parts, and the part VC1 is shown in plan view in FIG. 14. A plurality of chambers VK1 through VK3 that proceed transversely relative to the throughput axis of the light waveguides LW1 through LWn are provided. These chambers respectively connect to one another by a through connecting channel VD. The connecting channel VD connects to an admission funnel ETV to which the light waveguides LW1 through LWn are supplied. The admission channel ETV and the connecting channel VD additionally effect a certain pre-ordering of the light waveguides. Its principal job, however, is comprised in preventing the penetration of air into the preliminary stage US and also into the coating means BE on the basis of an under-pressure or vacuum VA. To this end, at least one of the transverse channels, for example VK1, is connected by a connecting line VL to the extraction means VE, whereby the under-pressure or vacuum VA is applied expediently and lies in the order of magnitude between 0.1 bar and 0.5 bar, and is preferably 0.3 bar. Since the various chambers VK1 through VK3 are connected to one another by the through channel VD, the vacuum that is applied also proceeds into the other channels so that increasingly less air is present in the region of the light waveguides LW1 through LWn. The width of the through channel VD in its narrowest region is to be expediently selected only approximately +5% greater than the outside dimension of the light waveguides LW1 through LWn placed immediately against one another. The individual sub-sections of the connecting channel VD are, likewise, expediently spread approximately funnel-shaped in order to guarantee an optimum unimpeded passage. Seals DI are also provided between the vacuum stage VC and the preliminary or overflow stage US to guarantee a pressure-tight connection.

If some of the coating material BM1, BM2 in the chamber UK still proceeds via the admission funnel EU up to the extraction unit VC, then this coating material is collected in the last antechamber VK3. Due to the provisions of a plurality of chambers VK1 through VK3, the under-pressure or vacuum is reduced to such an extent by the throttling of the fiber entry gaps that the resin can hardly run into the extraction chambers.

Although various minor modifications may be suggested by those versed in the art, it should be understood that we wish to embody within the scope of the patent granted hereon all such modifications as reasonably and properly come within the scope of our contribution to the art.

We claim:

1. In a method for manufacturing an optical ribbon conductor having a plurality of aligned light waveguides surrounded by an external coating, which includes providing coating means for applying a curable coating material on waveguides, means for supplying the curable coating material to the coating means, conducting a plurality of pre-coated light waveguides through the coating means to enclose the light waveguides in the coating material, the improvements comprising guiding the light waveguides to freely run both proceeding as well as in the coating means to essentially come in contact only with the supply of liquid coating material in the coating means, creating a drag flow of the liquid coating material by the longitudinal movement of the light waveguide through the coating material in a tapering discharge channel having a rectangular cross section, utilizing the drag flow to create a self-alignment of the light waveguides within the coating material and the coating means, said self-alignment providing a uniform and symmetrical distribution of the light waveguide within the contour of the ribbon conductor with the axes of the light waveguides being arranged practically in one plane and the coating material being applied on the light waveguides with approximately the same thickness, and then completing the forming of the ribbon conductor by curing said liquid coating material after leaving the coating means to form the external coating for holding the plurality of aligned light waveguides together.

2. In a method according to claim 1, which includes positioning the waveguides in a side-by-side alignment prior to conducting them through the coating means.

3. In a method according to claim 1, which includes a step of supplying coating material to the coating means under an admission pressure.

4. In a method according to claim 3, wherein the step of supplying the coating material under an admission pressure selects the admission pressure so that the drag flow in a discharge region of the coating means prevails over the pressure flow produced by the admission pressure.

5. In a method according to claim 3, wherein the step of suppling the coating material under an admission pressure allows a portion of the coating material to flow through an admission channel of the coating means in a direction opposite to the direction of movement of the light waveguides.

6. In a method according to claim 1, wherein the coating means has two discharge channels aligned along a path of movement of the light waveguides, and said step of creating a drag flow creates a drag flow in each of the discharge channels.

7. In a method according to claim 6, which includes recontacting the light waveguides after passing through the first of the two discharge channels prior to the second discharge channel with the coating material.

8. In a method according to claim 1, wherein the step of creating a drag flow creates a drag flow of a different amount in a direction perpendicular to the plane of the ribbon conductor from an amount extending parallel to the plane of the ribbon conductor.

9. In a method according to claim 1, wherein the coating material is conducted past the light waveguides in a first direction which is opposite to the direction of movement of the waveguides through the coating means and includes eliminating the material flowing in said first direction.

10. In a method according to claim 9, wherein the step of eliminating includes providing a catching reservoir, creating a vacuum in the catching reservoir to draw the material thereto.

11. In a method according to claim 1, wherein the means for supplying coating material includes a reservoir for the coating material and includes applying a pressure in said reservoir.

12. In a method according to claim 1, which includes providing a vacuum unit on an inlet to the coating means and creating a vacuum in the vacuum unit to remove air entrapped on the light waveguides prior to introduction into the coating means.

13. An apparatus for manufacturing an optical ribbon conductor having a plurality of light waveguides extending side-by-side and coated with a coating material, said apparatus including coating means applying a coating on waveguides and means for positioning a plurality of waveguides side-by-side with their axes being arranged practically in one plane and with the coating material being applied on the light waveguides with approximately the same thickness, and guiding the waveguides into an entrance of the coating means, the improvements comprising the entrance and exit of the coating means being dimensioned so that the light waveguides are guided freely in the coating means to come into contact only with the coating material, said coating means including at least one discharge channel having a rectangular cross section and tapering in a through-put direction with the taper creating a drag flow of the coating material to occur due to the longitudinal motion of the waveguides through said discharge opening.

14. In an apparatus according to claim 13, wherein the entrance of the coating means is an admission channel having a wedge-shaped sub-region.

15. In an apparatus according to claim 14, wherein the admission channel has a second sub-region following the wedge-shaped sub-region having a substantially constant tubular shape.

16. In an apparatus according to claim 13, wherein the entrance of the coating means is an admission channel having an opening greater than the cross sectional area of the waveguides so that there is adequate spacing between the waveguides and the walls of the admission channel.

17. In an apparatus according to claim 16, wherein the admission channel has a width be which is selected to be between 0.05 mm and 0.2 mm larger at its narrowest location than n(d1), wherein n denotes the number of light waveguides and d1 is the outside diameter of the waveguides.

18. In an apparatus according to claim 16, wherein the admission channel, at its narrowest location, has a height which is selected to be between 0.05 mm and 0.2 mm greater than the outside diameter of the light waveguides.

19. In an apparatus according to claim 13, wherein the entrance to the coating means has an admission channel with a wedge-shaped sub-region having a length of approximately 5 mm.

20. In an apparatus to claim 19, wherein the admission channel has a tubular sub-region following the wedge-shaped sub-region having a length of between 0.5 mm and 6 mm.

21. In an apparatus according to claim 13, wherein the coating means has an inner chamber containing the coating material, said light waveguides passing through the entrance of the coating means into the inner chamber for contacting only the coating material in this chamber.

22. In an apparatus according to claim 21, wherein coating means has two outer chambers with the inner chamber being disposed therebetween, said outer chambers being in communication with the inner chamber and the coating material being supplied to the inner chamber through the two outer chambers.

23. In an apparatus according to claim 13, wherein the coating means includes at least one chamber containing coating material having a discharge channel tapering in the throughput direction so that the waveguides pass through the chamber and then through the discharge channel.

24. In an apparatus according to claim 23, wherein the discharge channel has an approximately wedge-shaped sub-region adjacent to said chamber.

25. In an apparatus according to claim 24, wherein the discharge channel has a tubular sub-region following the wedge-shaped sub-region.

26. In an apparatus according to claim 24, wherein the wedge-shaped discharge channel has an angle of taper in a plane extending perpendicular to the latitudinal axis of the ribbon conductor being formed, which angle is selected to be in a range of 5° and 20°.

27. In an apparatus according to claim 26, wherein said angle is around 8°.

28. In an apparatus according to claim 26, wherein the sub-region has an angle of taper extending parallel to the latitudinal axis of the ribbon conductor in a range of between 5° and 20°.

29. In an apparatus according to claim 28, wherein each of said angles is around 8°.

30. In an apparatus according to claim 24, wherein the narrowest portion of the discharge channel in a direction extending parallel to the plane formed by the waveguides in the ribbon conductor has a width greater than n(d1), wherein n denotes the number of light waveguides and d1 is the outside diameter of the light waveguides.

31. In an apparatus according to claim 30, wherein the width is 0.05 mm through 0.2 mm greater than n(d1).

32. In an apparatus according to claim 24, wherein the height of the discharge channel in its smallest cross section is greater than the outside diameter of the light waveguides passing therethrough.

33. In an apparatus according to claim 32, wherein the height is selected to be 0.05 mm through 0.2 mm larger than the outside diameter of the light waveguides passing therethrough.

34. In an apparatus according to claim 13, wherein the coating means has a first chamber with a discharge channel and a second chamber with a discharge channel aligned therewith so that the waveguides pass through the first chamber and discharge channel and then through the second chamber and discharge channel.

35. In an apparatus according to claim 13, wherein the discharge channel has a taper in a direction extending perpendicular to the plane of the ribbon conductor being formed that is larger than the taper of the walls of the discharge channel extending parallel to said plane.

36. In an apparatus according to claim 35, wherein the angle of the walls of the discharge channel perpendicular relative to the plane is selected to be two to four times greater than the angle of the walls of the discharge channel along the plane of the ribbon conductor.

37. In an apparatus according to claim 13, wherein the admission channel for the coating means has a greater taper in a direction perpendicular relative to a plane of the waveguides in the ribbon conductor than along said plane.

38. In an apparatus according to claim 13, which includes an overflow unit being provided immediately proceeding the coating means, said overflow unit being connected to that region of the coating means that contains the coating material via at least one connecting channel.

39. In an apparatus according to claim 38, which includes a vacuum chamber being positioned preceding the overflow unit so that the light waveguides are de-gassed as they are moving into the coating means.

* * * * *